US009704114B1

(12) United States Patent
Mishra et al.

(10) Patent No.: US 9,704,114 B1
(45) Date of Patent: Jul. 11, 2017

(54) SYSTEMS AND METHODS FOR RECORDING DEFECTS

(71) Applicant: Amazon Technologies, Inc., Reno, NV (US)

(72) Inventors: Devesh Mishra, Snoqualmie, WA (US); Eric C. Young, Mercer Island, WA (US); Timothy Jesse Tien, Seattle, WA (US); Jun Zhao, Bellevue, WA (US); Sameer Vinod Shah, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 14/200,643

(22) Filed: Mar. 7, 2014

Related U.S. Application Data

(63) Continuation of application No. 12/329,821, filed on Dec. 8, 2008, now Pat. No. 8,744,886.

(51) Int. Cl.
  *G06F 7/00* (2006.01)
  *G06Q 10/06* (2012.01)
  *G06Q 10/08* (2012.01)

(52) U.S. Cl.
  CPC ......... *G06Q 10/0631* (2013.01); *G06Q 10/08* (2013.01)

(58) Field of Classification Search
  CPC .................................................... G06Q 10/08
  USPC ........................................................ 700/222
  See application file for complete search history.

(56) References Cited

U.S. PATENT DOCUMENTS

| 4,691,830 | A | * | 9/1987 | Ahl | B07C 5/3408 |
| | | | | | 209/523 |
| 5,428,657 | A | * | 6/1995 | Papanicolopoulos | G01N 33/12 |
| | | | | | 378/86 |
| 5,896,294 | A | | 4/1999 | Chow et al. | |
| 5,935,285 | A | | 8/1999 | Lucas | |
| 6,240,633 | B1 | | 6/2001 | Kent et al. | |
| 6,483,938 | B1 | | 11/2002 | Hennessey et al. | |
| 6,687,633 | B2 | | 2/2004 | Ono et al. | |
| 7,218,974 | B2 | * | 5/2007 | Rumi | G05B 13/0275 |
| | | | | | 318/561 |
| 7,607,545 | B2 | | 10/2009 | Daniel | |
| 2002/0155628 | A1 | | 10/2002 | Bulaga et al. | |
| 2004/0086168 | A1 | | 5/2004 | Kuwabara | |
| 2005/0027656 | A1 | | 2/2005 | Tobler et al. | |
| 2006/0049252 | A1 | * | 3/2006 | Guyett | G07C 13/00 |
| | | | | | 235/386 |

(Continued)

OTHER PUBLICATIONS

Fine, et al. "Managing Quality Improvement" (1984) Sloan School of Management, Massachusetts Institute of Technology, p. 1-50.

(Continued)

*Primary Examiner* — Sujay Koneru
(74) *Attorney, Agent, or Firm* — Thomas Horstemyer, LLP

(57) ABSTRACT

Disclosed are various systems, methods, and other embodiments for processing and recording defects. In one embodiment, an application is executed in a server that processes and records defects detected by a user at a receiving station client. Based on a retrieved vendor profile, the application selects an inspection sequence for a user to execute. The inspection sequence is selected based on a history of defects specified in the vendor profile. The application also determines whether supervision is needed based on the performance of the user.

20 Claims, 9 Drawing Sheets

(56) References Cited

U.S. PATENT DOCUMENTS

| | | | |
|---|---|---|---|
| 2006/0149407 A1* | 7/2006 | Markham | B23Q 35/12 |
| | | | 700/108 |
| 2006/0224434 A1* | 10/2006 | Rumi | G06Q 10/06 |
| | | | 705/7.27 |
| 2008/0300809 A1 | 12/2008 | Yang et al. | |

OTHER PUBLICATIONS

U.S. Appl. No. 12/329,821, filed on Dec. 8, 2008, and entitled "Systems and Methods for Recording Defects".

* cited by examiner

Receiving Station 10
User: John Smith

*Login*
*Logout*

Please select the defect type from the list below:

○ WRONG BINDING  ← 402

○ NO PRODUCT IDENTIFIER FOUND

● INCORRECT TITLE

○ - - -

COMMENTS/ADDITIONAL DEFECTS: — 404

DVD title does not match product description on label

SUBMIT

Receiving Station 10                     *Login*
User: John Smith         602                *Logout*

Log of Defects

| DEFECT TYPE | PO NO. | PRODUCT ID | RECEIVER | TIME STAMP |
|---|---|---|---|---|
| ○ WRONG BINDING | Q9864135 | 0934316710 | jsmith | 18:52 3/26/08 |
| ○ INCORRECT TITLE | Q9224135 | 0931418312 | jsmith | 18:54 3/26/08 |
| ● WRONG BINDING | Q9536331 | 0923516710 | jsmith | 19:02 3/26/08 |
| ○ PROD. ID NOT FOUND | Q2158220 | 0000000000 | jsmith | 19:07 3/26/08 |
| ○ WRONG BINDING | Q9231135 | 0921431510 | jsmith | 19:27 3/26/08 |

604

Click on a defect to research and press SUBMIT.    SUBMIT

606

** Please see your supervisor before proceeding.

FIG. 6

SYSTEMS AND METHODS FOR RECORDING DEFECTS

CROSS-REFERENCE TO RELATED APPLICATIONS

This application is a continuation of, and claims priority to, co-pending U.S. Patent Application entitled "SYSTEMS AND METHODS FOR RECORDING DEFECTS," filed on Dec. 8, 2008, and assigned application Ser. No. 12/329,821, which is incorporated herein by reference in its entirety.

BACKGROUND

Materials handling facilities, such as product distribution or fulfillment centers, process a large amount of inventory. As such, a significant amount of resources may be required in tracking defective products. Generally, for a received parcel that is defective, a user sets aside the defective product so that the product is not received into inventory. A defective parcel may include a damaged package or product, defective tracking information, such as an inaccurate, missing, or illegible purchase order (PO) or vendor information, or other shipment errors. Ensuring that the appropriate information has been captured for incoming parcels at a materials handling facility and recording exceptions for such parcels can be burdensome and expensive.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 3-4 are drawings that depict examples of user interfaces rendered in a receiving station client in the networked environment of FIG. 1 according to an embodiment of the present disclosure.

FIG. 6 is a drawing that depicts an example of a user interface rendered in a receiving station client in the networked environment of FIG. 1 according to an embodiment of the present disclosure.

DETAILED DESCRIPTION

When a user sidelines a defective product, the user typically fills out a problem slip of some type and records details relevant to the defect. A problem solver may later receive the defective product and attempt to address the defect based on the problem slip. However, there are various perceived shortcomings with this approach. The defect is manually logged and is not tracked by the system in an automated fashion. As such, there is no consistent way of tracking incoming parcels upon arrival at the fulfillment center. Upon manually generating a problem slip, the user typically places the defective product into a defects bin. There is, however, very little visibility from a system level regarding the location of defective products. Another perceived shortcoming is that the user typically has little incentive to fill out a problem slip as this can be a time consuming process. The time spent in filling out problem slips is generally not accounted for in the actual performance of a user. This can lead to incomplete or inaccurate problem slips being generated.

Various embodiments are described for accurately and efficiently recording defects found in incoming parcels. To this end, the various embodiments ensure reliable delivery of products into a defects bin or into inventory, as will be described in greater detail below. Furthermore, various embodiments incorporate quality control measures by both evaluating performance of a user and determining when supervision is needed.

Figure 1:
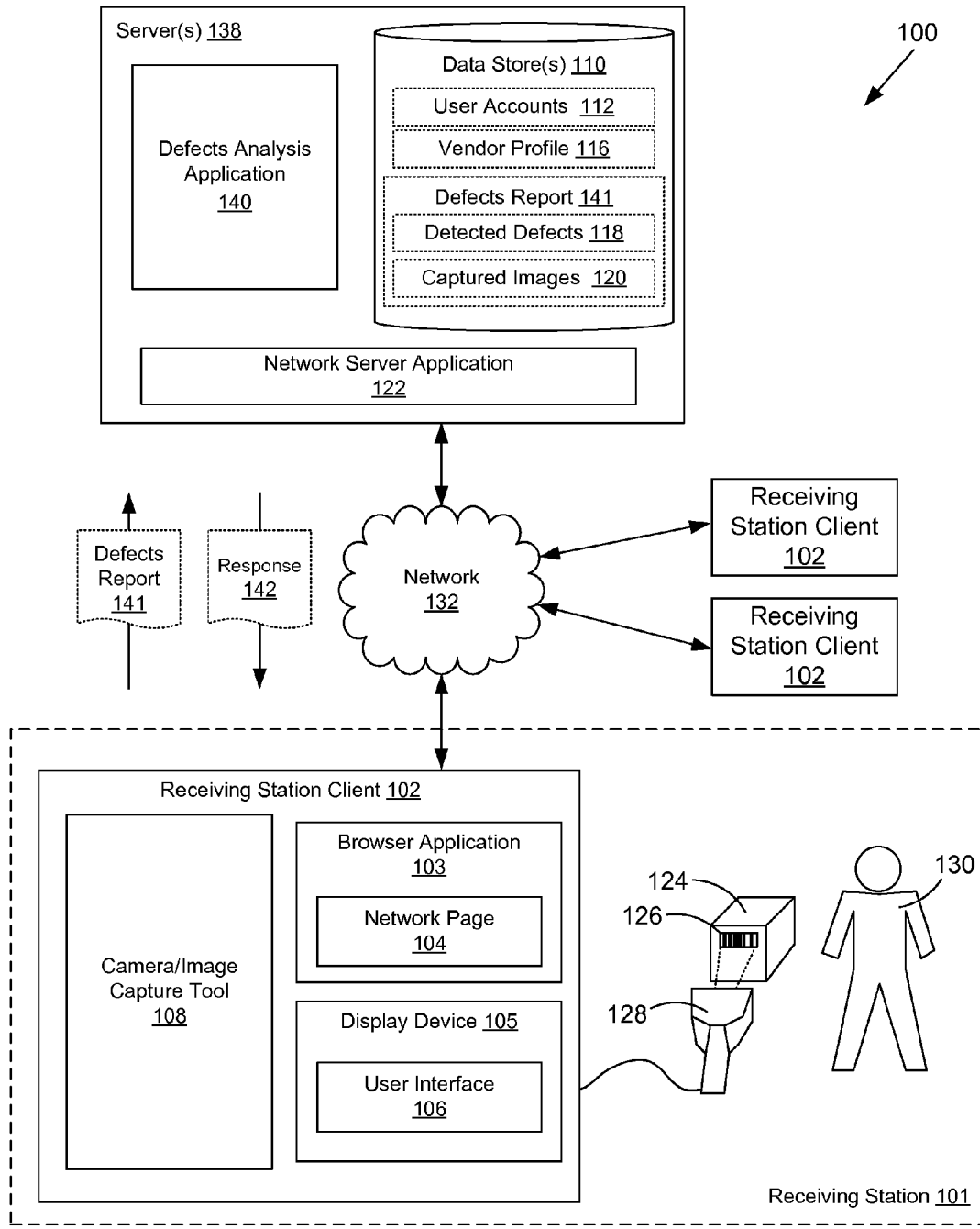
FIG. 1 is a drawing of a networked environment according to an embodiment of the present disclosure.

In the following discussion, a description of the various components of a networked environment is described, followed by a discussion of the operation thereof. With reference to FIG. 1, shown is a networked environment 100 showing at least one server 138 implementing a defects analysis application 140 and at least one receiving station client 102. The server 138 may represent one or more servers that may be configured to work in coordination with each other. Alternatively, such servers 138 may be arranged in some other manners, as can be appreciated.

In accordance with various embodiments, the networked environment 100 includes one or more servers 138 that communicate with one or more receiving station clients 102 via the network 132. The network 132 includes, for example, the Internet, intranets, wide area networks (WANs), local area networks, wireless networks, or other suitable networks, etc., or any combination of two or more such networks. The server 138 may comprise one or more server computers arranged in a server bank or other arrangement. Furthermore, the server 138 may be arranged in a single location or may be arranged in a distributed configuration comprising multiple servers located across different geographical areas.

The server 138 is employed to execute various applications such as, for example, a defects analysis application 140 and a network server application 122. Associated with the one or more servers 138 is a data store 110 which stores various data or files that are accessed by the defects analysis application 140 for processing and recording defective products, as will be described later in this disclosure. As shown in FIG. 1, the data store 110 stores user account information 112 associated with users 130 of the receiving station client 102. Such user account information 112 may comprise the name of the user 130 and contact information in addition to a record of past performance of the user 130 relating to detection of defective parcels. User account information 112 may further comprise an indicator of the experience level of the user 130.

In accordance with some embodiments, the data store 110 may further store received defects reports 141, each of which may comprise a vendor profile 116, one or more detected defects 118, and captured images 120 of the defective product. For purposes of this disclosure, a "defect" or "exception" refers to any of a variety of conditions including, but not limited to, unknown product identifiers, product identifiers that link to multiple items, and incorrect titles (e.g., where the parcel title does not match the title of the item within the parcel). The vendor profile 116 comprises information relating to a particular vendor. Such information may comprise, for example, a history of defective products associated with that particular vendor. For some embodiments, the vendor profile 116 may also contain vendor information that can be used for requesting charge-backs from vendors for defected products.

The defects analysis application 140 is employed to receive a defects report 141 generated at the receiving station client 102 and provide a response 142 to the receiving station client 102. Such a response 142 may comprise, for example, guidelines or a sequence of steps for addressing the detected defect 118. As another non-limiting example, the response 142 may also comprise an acknowledgement from the server 138 that a defects report 141 has been received. The network server application 122 in the server 138 facilitates communication with various applications on the receiving station client 102 including a browser application 103, which renders a network page 104 to a user 130. In particular, the browser application 103 may be executed in a receiving station client 102 for accessing and rendering network pages 104 such as web pages or other network content generated by the one or more servers 138. The network page 104 facilitates the inspection process conducted by the user 130. As a non-limiting example, the user 130 may receive step-by-step instructions via the network page 104 for inspecting a parcel 124.

Network pages 104 may be generated dynamically, for example, based upon the network page 104 data and other data stored in the data store 110. In accordance with some embodiments, the browser application 103 interfaces with the network server application 122 and the defects analysis application 140 in order to obtain a network page 104. The network page 104 is implemented by the browser application 103 and generates a user interface 106 on a display device 105 associated with the receiving station client 103. As depicted in FIG. 1 by the dashed boundary line, a receiving station 101 generally comprises both a receiving station client 102 and a user 130 who handles incoming parcels. In particular, the receiving station client 102 includes a display device 105 and a user interface 106 for guiding a user 130 through an inspection process for an incoming parcel 124. The user 130 may also manipulate the user interface 106 to generate a defects report 141. For some embodiments, the user 130 may also utilize the user interface 106 to enter comments for the defects report 141.

The receiving station client 102 may also include a barcode reader 128 for scanning a product identifier 126 on an incoming parcel 124. It should be noted, however, that while a barcode reader 128 is depicted in FIG. 1, other input devices may also be used. Such input devices may include a keyboard, mouse, microphone, or other device. Based on the scanned product identifier 126, the server 138 retrieves a vendor profile 116 associated with the product identifier 126 from the data store 110. As described earlier, the server 138 selects an inspection sequence for the user 130 to execute based on the vendor profile 116. For example, if a particular vendor profile 116 reflects that a particular vendor has a past history of defects, a higher level of scrutiny may be applied during the inspection process. In this regard, the server 138 selects an appropriate inspection sequence, which may be rendered as a network page 104 at the receiving station client 102. The network page 104 guides the user 130 through the selected inspection process.

The receiving station client 102 further comprises a camera 108 or some type of image capture tool 108 for capturing images of defective products. In particular, the camera 108 associated with the receiving station client 102 is used to input an image 120 taken of the defective product as proof of the condition of such shipment when received. The captured image 120 may be bundled with other information and sent by the receiving station client 102 in the form of a defects report 141. As depicted in FIG. 1, the receiving station client 102 may represent one or more clients configured to access information on the server 138. The receiving station client 106 may comprise, for example, a mobile processor based system such as, for example, a personal digital assistant, laptop, cellular telephone with processing capability, or other device.

Figure 2:
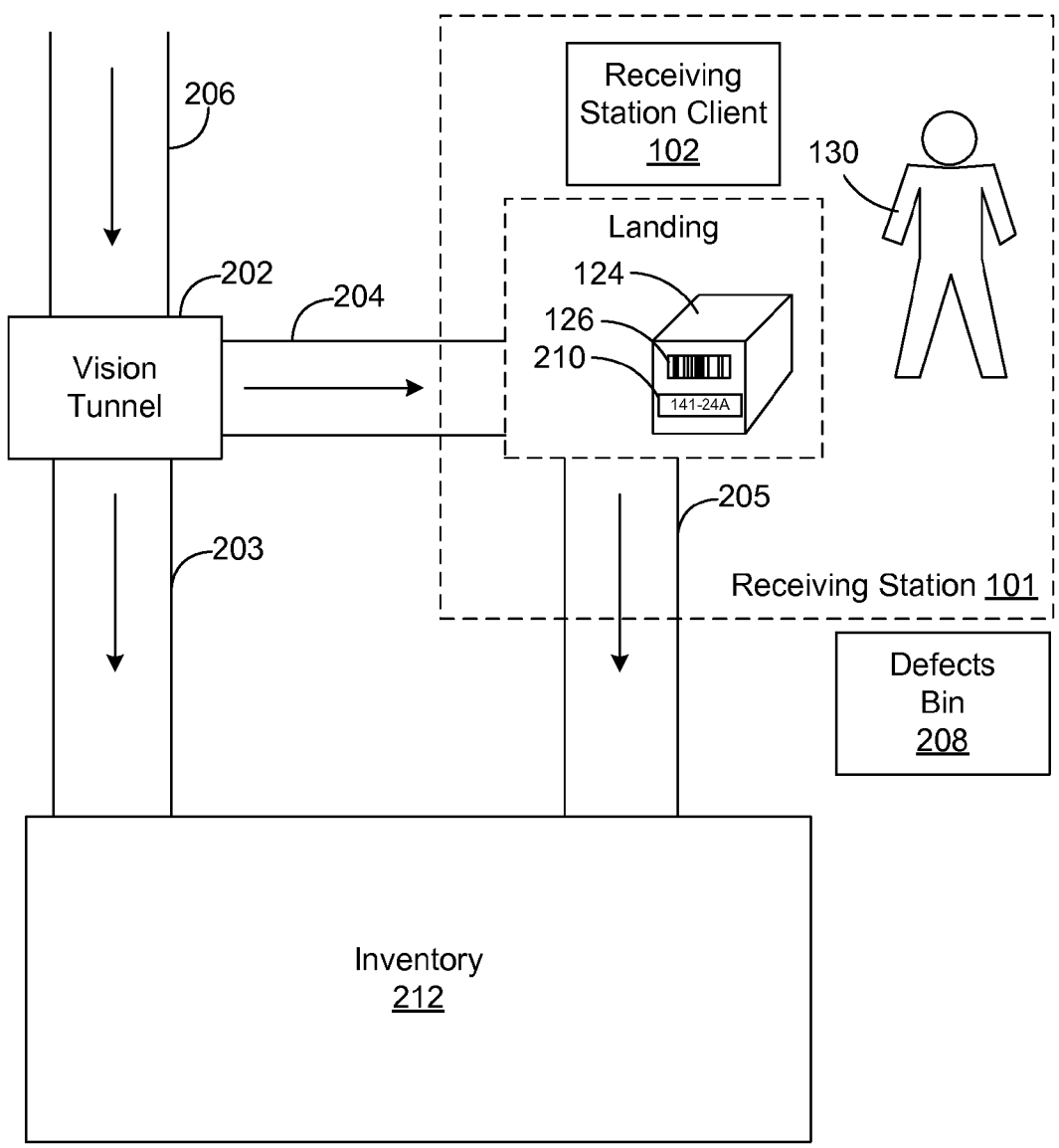
FIG. 2 is a drawing illustrating an exemplary flow of a shipment parcel processed through a receiving station client in the networked environment of FIG. 1 according to an embodiment of the present disclosure.

FIG. 2 is a drawing illustrating an exemplary flow of a shipment parcel through the receiving station client 102 in the networked environment 100 of FIG. 1 according to an embodiment of the present disclosure. For some embodiments, an incoming parcel 124 at a materials handling facility may enter a vision tunnel 202 on a conveyor belt 206. The vision tunnel 202 generally tracks incoming parcels 124 and performs such functions as scanning tracking information and scanning for high-level defects. The vision tunnel 202 takes images 120 of all sides of an incoming parcel 124 and confirms that a particular shipment has been received. In accordance with some embodiments, if the vision tunnel 202 does not detect an issue with an incoming parcel 124, then the vision tunnel 202 interfaces with the server 138 and based on the vendor profile 116 (FIG. 1), determines whether the associated vendor has a history of recorded defects. If the vendor has a clean history, the incoming parcel 124 passes through the vision tunnel 202 and to inventory 212 via a "fast track" path on conveyor belt 203. If, however, the vision tunnel 202 detects an issue with an incoming parcel 124 or if the vendor has a past history of recorded defects, the incoming parcel is sidelined and passed to the receiving station 101 on the conveyor belt 204 for a more in depth inspection. In this regard, incoming parcels 124 received from certain vendors with prior histories of defects, for example, can be monitored with a higher level of scrutiny during a probation period. It should be noted that while FIG. 2 depicts parcels 124 being received first at a vision tunnel 202 before being forwarded to the receiving station 101, incoming parcels may also be routed directly to the receiving station 101. It is understood that all such variations are within the scope of the present disclosure.

At the receiving station 101, the user 130 receives the sidelined parcel 124 on a landing, for example, and scans the product identifier 126, thereby entering the same into the system. The user 130 opens the parcel 124, and the item in the parcel 124 undergoes an inspection process, as selected by the server 138 (FIG. 1). If a defect 118 is detected during the inspection process, a defects report 141 is generated at the receiving station 101 and sent to the server 138. The server 138 generates a corresponding product defect identifier 210 for tracking purposes. The user 130 places the product defect identifier 210 which may be in the form of a case sticker, for example, onto the defective parcel 124. The server 138 then generates instructions which are rendered at the receiving station client 102 instructing the user 130 to place the defective parcel 124 in a defects bin 208. In the event that the defect 118 can be resolved, the user 130 may be instructed to forward the parcel 124 to inventory 212 via the conveyor belt 205.

Figure 3:
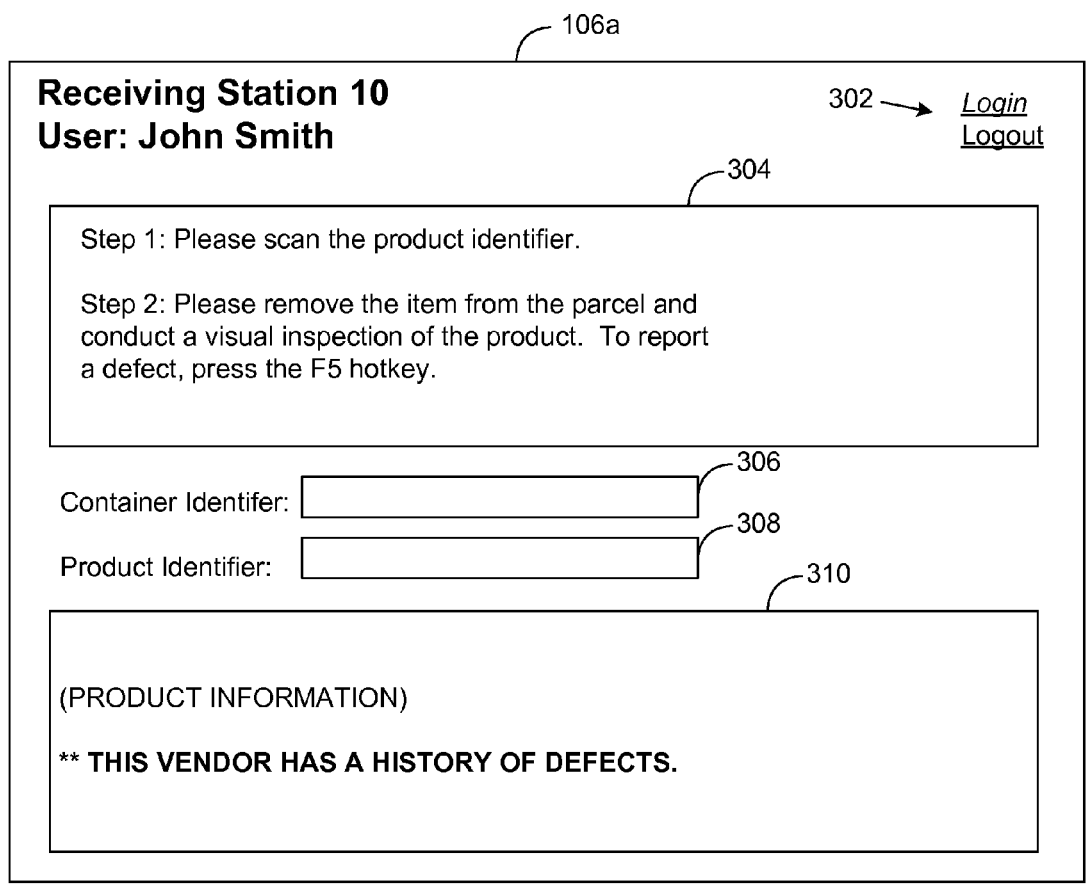

FIG. 3 is a drawing of one example of a user interface 106a according to various embodiments. Referring back briefly to FIG. 1, a user interface 106 is rendered on a display device 105 associated with a respective receiving station client 102 based upon a network page 104, as implemented by a browser application 103. Alternatively, the user interface 106 may be generated on the display device 105 via some other application. With reference now to FIG. 3, the user interface 106a depicted includes a user login link 302 that a user 130 utilizes to enter login information. The login information may be received at the server 138 (FIG. 1) and used to retrieve user account information 112. For the example shown in FIG. 3, the name of the user 130 is "John Smith," and "Receiving Station 10" is being utilized as the receiving station 101 (FIG. 2) for the inspection process.

An instruction box 304 is depicted which provides the user 130 with step-by-step instructions based on the inspection process selected by the server 138 (FIG. 1). The user interface 106a may include a container identifier 306, which corresponds to a container holding one or more parcels 124. A product identifier box 308 displays product identification when the user scans or otherwise enters the product identifier 126 located on an incoming parcel 124. Also, a product information box 310 is included, which provides detailed product information. Such product information may comprise, for example, the title of the item contained in the parcel 124 and the vendor associated with the item or other information. In accordance with some embodiments, the product information box 310 may also provide an indication that the vendor associated with the item has a past history of defects. This alerts the user 130 to apply a higher level of scrutiny in performing the inspection process.

Reference is now made to FIG. 4, which depicts an example of a user interface 106b in accordance with some embodiments that a user 130 manipulates in order to generate a defects report 141 (FIG. 1). For some embodiments, a list of exceptions is generated by the defects analysis application 140 at the server 138 (FIG. 1) and rendered at the receiving client station 102 (FIG. 1) from which the user 130 may select. The list of exceptions may be generated, for example, in response to a hotkey (e.g., "F5") being pressed, for example. In particular, the user 130 presses the hotkey to alert the server 138 (FIG. 1) that a defect has been detected during the inspection process. In the non-limiting example shown, the user interface 106b includes a series of buttons 402 corresponding to different exceptions from which the user 130 may select. For example, the user 130 may indicate that the item within a particular parcel 124 has an incorrect title by manipulating the third button. As another example, the user 130 may find that a parcel 124 does not have a product identifier 126. The user 130 thus manipulates the button corresponding to "No Product Identifier Found." For some embodiments, multiple buttons 402 may be manipulated at the same time to indicate that multiple defects are detected.

The user interface 106b may also include a comments box 404 which allows the user 130 to manually type in a description of the defect. Once the one or more exceptions are selected, the user 130 clicks on the submit button 408 to record and generate a defects report 141. As part of the inspection process, the user 130 may also be instructed to capture an image 406 of the defective parcel 124. As described earlier, the camera 108 (FIG. 1) associated with the receiving station client 102 is used to input an image taken of the defective parcel 124 as proof of the condition of such parcel 124 when received. The image 406, along with the selected exceptions, are captured in a defects report 140.

The defects report 141 is received by the server 138 and archived in the data store 110 (FIG. 1).

In accordance with various embodiments, quality control of the performance of the user 130 is carefully maintained in order to normalize the detection process. In this regard, the performance of each user 130 is carefully monitored and based on the past performance of each user 130, and a determination is made on whether supervision is needed. For example, due to inexperience on the part of a particular user 130, the user 130 may require additional training due to an unacceptable rate of false detections. For some embodiments, determining whether supervision is required involves determining a current rate of detected defects 118 reported by the user 130, where the current rate is based on a number of defects reported by the user 130 over a predetermined period of time.

Figure 5A:
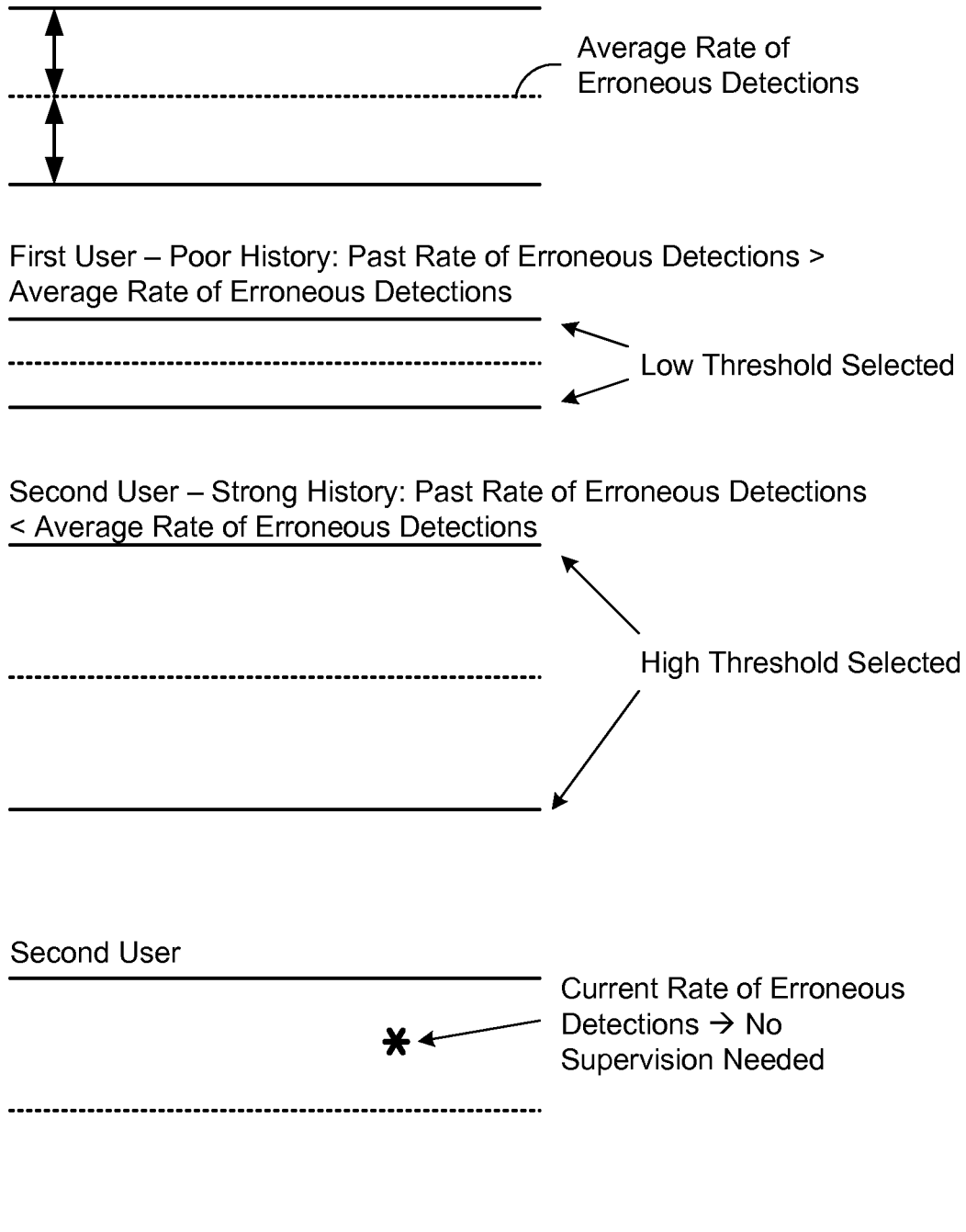
FIGS. 5A-B are drawings illustrating a selection of various thresholds according to an embodiment of the present disclosure.

The past rate of erroneous detections of the user 130 is also examined. In particular, a threshold is specified based on a comparison of the past rate of erroneous detections of the user 130 and an average rate of erroneous detections associated with a plurality of users. In this regard, a relative comparison is made between the past performance of the user 130 and the past performance of all other users. By way of illustration, reference is made to FIG. 5A. As shown, a relatively low threshold is specified when the past rate of erroneous detections of the user 130 is greater than the average rate of erroneous detections, and a relatively high threshold is specified when the past rate of erroneous detections of the user 130 is less than the average rate of erroneous detections. Supervision is needed when the current rate of detected defects 118 is greater than the threshold, and supervision is not needed when the current rate of detected defects 118 is within a tolerance level or region defined by the specified threshold, as illustrated at the bottom of FIG. 5A.

Figure 5B:
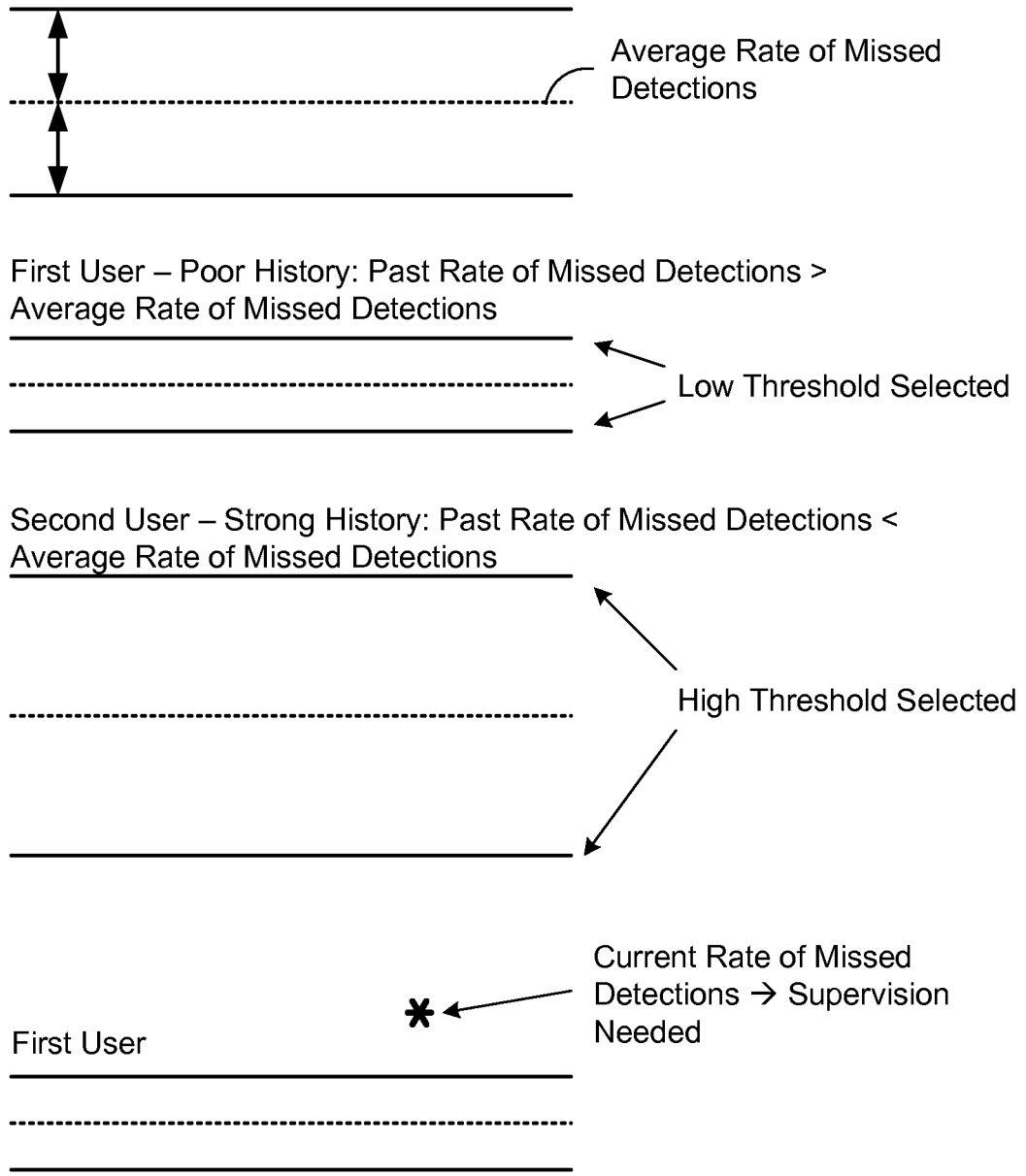

Likewise, if the past performance of a user 130 indicates that the user 130 has a history of missing defects, supervision may also be needed. As such, a relative comparison is made between the past performance of the user 130 regarding missed defects and the past performance of all other users regarding missed defects is also performed. With reference to FIG. 5B, a relatively low threshold is specified when the past rate of missed detections of the user 130 is greater than the average rate of missed detections, and a relatively high threshold is specified when the past rate of missed detections of the user 130 is less than the average rate of missed detections. As an example, suppose a user 130 has a past rate of missed detections of 15 misses for every 100 defects. Suppose also that the average rate of missed detections among all other users is just 2 misses for every 100 defects. In this non-limiting example, a relatively low threshold is associated with the user 130 as the user 130 has a past rate of missed detections that is greater than the average rate of missed detections. As illustrated at the bottom of FIG. 5B, supervision is needed when the current rate of missed defects is outside a tolerance level or region defined by the specified.

Reference is now made to FIG. 6, which is a drawing of a user interface 106c for reviewing defects reports 141 generated by a particular user 130. In the example user interface 106c shown, a given user 130 (i.e., John Smith) has generated a number of defects reports 602. As described above, the current rate of detected defects 118 is based on the number of defects reports 602 generated over a predetermined period of time (e.g., 30 minutes). The experience level of the user 130 is also taken into consideration. As a non-limiting example, suppose the user 130 John Smith has only 1 month of experience and has generated 5 defects reports 602 over the span of 30 minutes. Suppose also, that John Smith has a higher or lower past rate of erroneous detections relative to the average rate of erroneous detections. The average rate of erroneous detections may be based, for example, on all the users within the same materials handling facility or within a particular region. Based on this information, a threshold is specified. Since John Smith has a past rate of erroneous detections that is higher than the average rate, a lower threshold is assigned to John Smith. In this regard, a lower tolerance level is assigned to John Smith due to his lower performance level and level of inexperience. This threshold is then compared to the current rate of detected defects 118. If the current rate of detected defects 118 is higher than the threshold, supervision is needed.

In accordance with some embodiments, the defects analysis application 140 in the server 138 may generate an output that both indicates that supervision is needed and instructs the receiving station client 102 to halt further activity by the user 130. The defects analysis application 140 may also update the user account information 112 in the data store 110 to reflect that an output indicating that supervision is needed was generated by the server 138. Referring to FIG. 6, a message box 606 may alert the user 130 to inform his supervisor before proceeding. Alternatively, a supervisor may be contacted directly. A supervisor attending to the user 130 may click on one of the buttons 602 shown in FIG. 6 and click on the submit button 604 to further research a defects report 602 generated by the user 130. The supervisor may then re-inspect the tagged parcels 124 to confirm that the parcels are actually defective. In doing so, the performance of all the users 130 is normalized in order to maintain quality control over the inspection process.

Figure 7:
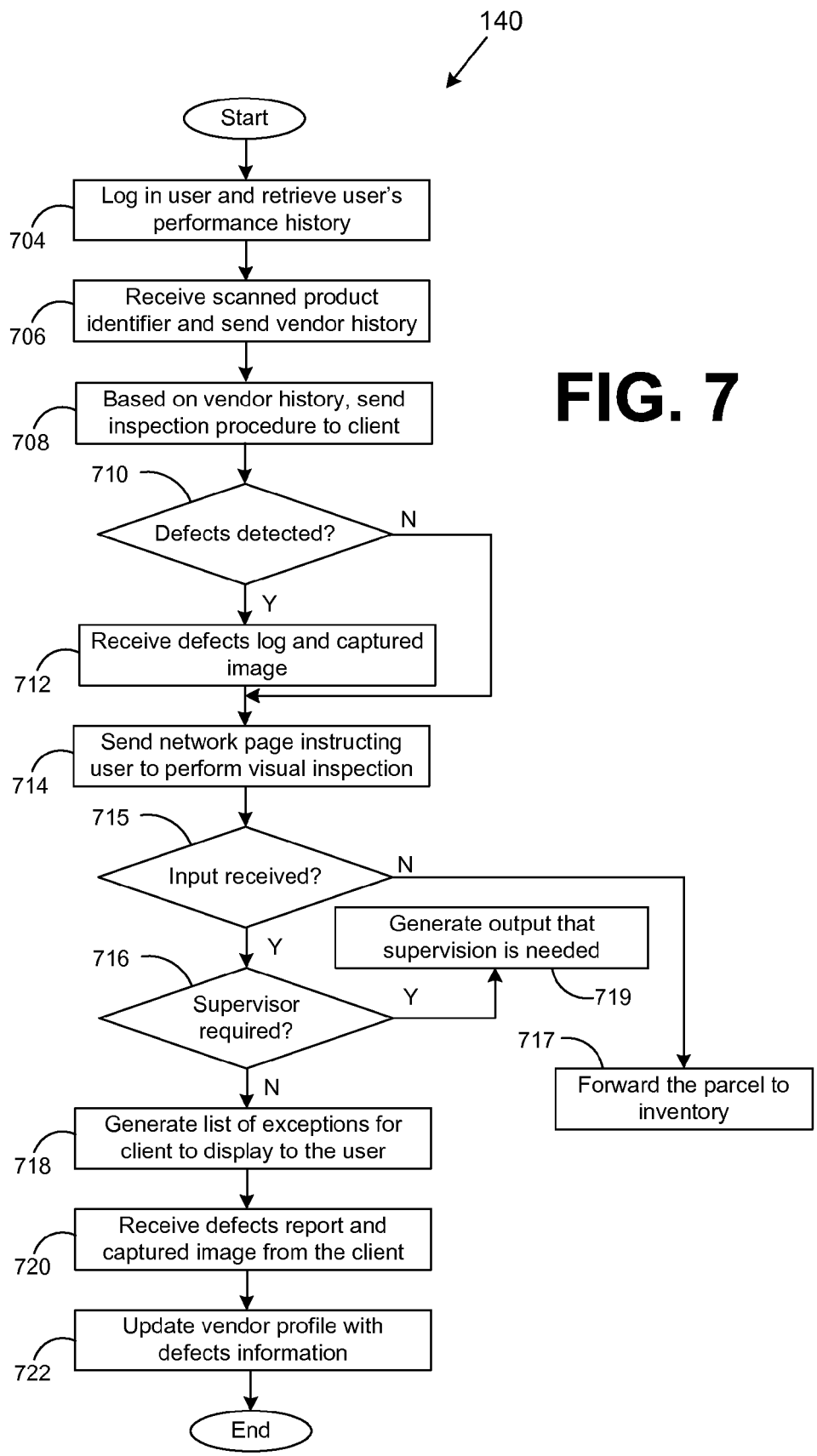
FIG. 7 depicts a flowchart that illustrates one example of functionality associated with a defects analysis application executed in a server in the networked environment of FIG. 1 according to an embodiment of the present disclosure.

Referring next to FIG. 7, shown is one flowchart that shows one example of functionality of the defects analysis application 140 executed in a server 138 in the networked environment 100 of FIG. 1. The flowchart of FIG. 7 may be viewed as depicting example steps of the method implemented in the one or more servers 138 in order to process defects detected at the receiving station clients 102.

Beginning with box 704, the defects analysis application 140 in the server 138 (FIG. 1) logs in a user 130 and retrieves the past performance history of the user 130. The past performance history of the user 130 may be stored as user account information 112 in the data store 110 associated with the server 138. In box 706, the defects analysis application 140 receives a scanned product identifier 126 associated with an incoming parcel 124 received at a receiving station client 102. The defects analysis application 140 retrieves a vendor profile 116 from the data store 110 and sends the vendor profile 116 to the receiving station client 102.

In box 708, the defects analysis application 140 selects an inspection sequence based on the history of defects specified in the retrieved vendor profile 116. Note that depending on whether the vendor has a history of defects, a higher level of scrutiny may be applied during the inspection process. In accordance with some embodiments, the receiving station client 102 where the incoming parcel 124 has been received performs an automated detection of defects. In particular, defects that may be detected by the receiving station client 102 are performed. Such defects may include parcels 124 with unknown titles, parcels 124 with product identifiers that link to multiple items, etc. In decision box 710, the defects analysis application 140 waits until a defect 118 is detected.

Assuming that a defect 118 is detected for the incoming parcel 124 in box 712, the defects analysis application 140 receives a defects report 141 that includes a captured image of the defective parcel 124. In box 714, the defects analysis application 140 sends a network page 104 to be rendered at the receiving client station 102 for instructing the user 130 to perform a visual inspection. Such an inspection may be performed to identify parcels 124 where the parcel title does not match the title of the item within the parcel 124, incorrect binding, etc. In decision box 715, the defects analysis application 140 then waits for an input to be received. For some embodiments, the defects analysis application 140 may wait until a hotkey is pressed by the user 130 at the receiving station client 102. As can be appreciated, other inputs may also be received. If no input is received (e.g., a hotkey is not pressed), then in box 717, the user 130 may be instructed to forward the parcel 124 to inventory 212.

If input is received, then in decision box 716, supervision may be required, depending on the current rate of detected defects 118 of the user 130. In such instances, an output is generated by the defects analysis application 140 that supervision is needed (box 719). If supervision is not needed, then in box 718, a list of exceptions is generated and rendered at the receiving station client 102 from which the user 130 may select. In box 720, the defects analysis application 140 receives a defects report 141 based on the exceptions selected by the user 130 in box 718. An image 120 of the defective parcel 124 is also received. In box 722, the vendor profile 116 associated with the defective parcel 124 is updated to reflect that a defect 118 was detected.

Figure 8:
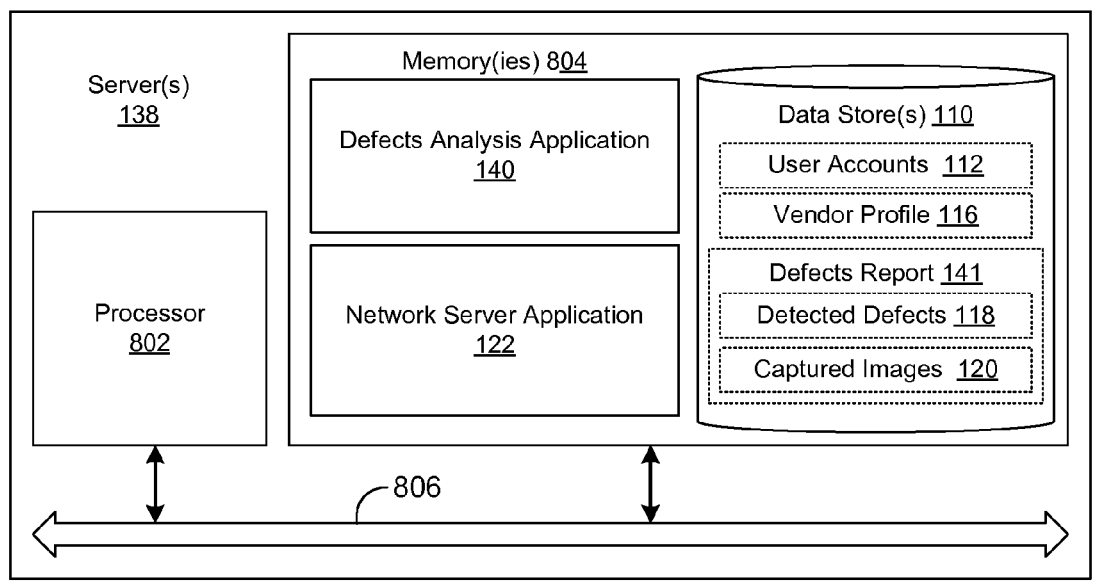
FIG. 8 is a schematic block diagram that provides one example illustration of a server employed in the networked environment of FIG. 1 according to an embodiment of the present disclosure.

Reference is now made to FIG. 8, which is a schematic block diagram of one example of a server 138 according to an embodiment of the present disclosure. The server 138 includes a processor circuit, for example, having a processor 802 and a memory 804, both of which are coupled to a local interface 806. To this end, the server 138 may comprise, for example, a server computer with such structure. The local interface 806 may comprise, for example, a data bus with an accompanying address/control bus or other bus structure as can be appreciated.

Stored in the memory 804 are both data and several components that are executable by the processor 802. In particular, stored in the memory 804 are the defects analysis application 140 and the network server application 122. In addition, a server operating system may be stored in the memory 804 and executed by the processor 802 as can be appreciated.

Also, user account information 112, defects reports 141, vendor profiles 116, detected defects 118, and captured images 120 of defects may be stored in the data store 110, for example, in the memory 804, or they may be stored in some other memory accessible to the server 138. It is understood that there may be other applications that are stored in the memory 804 and are executable by the processor 802 as can be appreciated. Also, other data may be stored in the memory 804 and accessed by the processor 802. Where any component discussed herein is implemented in the form of software, any one of a number of programming languages such as, for example, C, C++, Java, Java Script, Perl, Python, Flash, or other programming languages.

A number of software components are stored in the memory 804 and are executable by the processor 802. In this respect, the term "executable" means a program file that is in a form that can ultimately be run by the processor 802. Examples of executable programs may be, for example, a compiled program that can be translated into machine code in a format that can be loaded into a random access portion of the memory 804 and run by the processor 802, or source code that may be expressed in proper format such as object code that is capable of being loaded into a random access portion of the memory 804 and executed by the processor 802, etc. An executable program may be stored in any portion or component of the memory 804 including, for example, random access memory, read-only memory, a hard drive, compact disk (CD), floppy disk, or other memory components.

The memory 804 is defined herein as both volatile and nonvolatile memory and data storage components. Volatile components are those that do not retain data values upon loss of power. Nonvolatile components are those that retain data upon a loss of power. Thus, the memory 804 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the server 138 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 7 shows the functionality and operation of portions of the defects analysis application 140. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the defects analysis application 140 and/or any other component implemented in the server 138 as described above comprises software or code, the same can be embodied in any computer-readable medium for use by or in connection with an instruction execution system such as, for example, a processor in a computer system or other system. In this sense, the defects analysis application 140 and/or other components may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    capturing, in a vision tunnel positioned in a materials handling facility, a plurality of images of a plurality of sides of a product undergoing inspection;
    extracting, from the plurality of images via at least one computing device, a product identifier appearing within at least one of the plurality of images;
    identifying, from the product identifier via the at least one computing device, a vendor profile of a vendor from a data store, the vendor profile being associated with the product identifier;
    retrieving the vendor profile associated with the product identifier, the product identifier being associated with the product undergoing inspection;
    determining, via the at least one computing device, that the vendor is associated with a plurality of defective products based at least in part upon a vendor defect history specified in the vendor profile;
    redirecting, via the at least one computing device, the product to a receiving station based at least in part on the vendor being associated with the plurality of defective products, the receiving station comprising an image capture device and a display device;

determining, via the at least one computing device, a level of inspection for the product based at least in part upon the vendor defect history specified in the vendor profile;

selecting, via the at least one computing device, an inspection sequence for a user to execute based at least in part on the level of inspection;

displaying, via the at least one computing device, the inspection sequence on the display device of the receiving station;

capturing an image that represents a condition of the product via the image capture device of the receiving station; and updating, via the at least one computing device, the vendor profile in response to a defect report being obtained from the receiving station.

2. The method of claim 1, further comprising including, via the at least one computing device, the image that represents the condition of the product in the defect report.

3. The method of claim 1, further comprising generating, via the at least one computing device, the inspection sequence to include instructions for the user of the receiving station to capture an image of the product.

4. The method of claim 1, further comprising generating, via the at least one computing device, instructions for the user to forward the product to an inventory for fulfillment in response to the defect report indicating that no defect is detected.

5. The method of claim 1, further comprising generating, via the at least one computing device, instructions for the user to forward the product to a defects bin in response to the defect report indicating that at least one defect is detected.

6. The method of claim 5, further comprising:
determining, via the at least one computing device, whether supervision is needed based at least in part upon a performance history of the user; and
generating, via the at least one computing device, instructions for the user indicating that supervision is needed upon determining that supervision is needed.

7. The method of claim 6, wherein determining whether supervision is needed further comprises determining, via the at least one computing device, a current rate of erroneous detections of defects reported by the user, the current rate of erroneous detections of defects being based at least in part on a number of erroneous defects reported by the user over a predetermined period of time; and
generating, via the at least one computing device, a determination whether the supervision is needed based at least in part upon an analysis of a past rate of erroneous detections of defects by the user and the current rate of erroneous detections of defects.

8. The method of claim 7, wherein generating the determination further comprises:
specifying, via the at least one computing device, an error threshold based at least in part upon a comparison of the past rate of erroneous detections of the user with an average rate of erroneous detections associated with a population of users; and
generating, via the at least one computing device, the determination that supervision is needed by comparing the error threshold and the current rate of erroneous detections of defects reported by the user.

9. The method of claim 8, wherein generating the determination further comprises determining, via the at least one computing device, that supervision is needed when the current rate of erroneous detections of defects meets the error threshold.

10. The method of claim 8, wherein specifying the error threshold further comprises modifying, via the at least one computing device, the error threshold in response to a comparison of the past rate of erroneous detections of the user relative to the average rate of erroneous detections.

11. A system, comprising:
a first conveyor system;
a second conveyor system;
at least one computing device; and
a defects analysis application executable in the at least one computing device, the defects analysis application configured to cause the at least one computing device to:
capture a plurality of images of a plurality of sides of a product undergoing inspection on the first conveyor system;
extract a product identifier appearing within at least one of the plurality of images;
identify a vendor profile of a vendor, the vendor profile being associated with the product identifier extracted from the at least one of the plurality of images;
retrieve the vendor profile associated with the product identifier, the product identifier being associated with the product undergoing inspection;
determine that the vendor is associated with a plurality of defective products based at least in part upon a vendor defect history specified in the vendor profile;
initiate redirection of the product to a receiving station via the second conveyor system in response to the vendor being associated with the plurality of defective products, the receiving station comprising an image capture device and a display device;
retrieve a defects report generated by a user performing product inspections at the receiving station from a data store;
determine a level of scrutiny based at least in part on the vendor defect history specified in the vendor profile;
select an inspection sequence for execution based at least in part upon the level of scrutiny; and
capture an image that represents a condition of the product via the image capture device of the receiving station.

12. The system of claim 11, wherein the defects analysis application is further configured to determine whether supervision of the user is needed based at least in part upon a record of past performance by the user.

13. The system of claim 12, wherein the defects analysis application is further configured to cause the at least one computing device to:
generate a first output instructing the receiving station to discontinue further activity by the user;
generate a second output indicating that supervision is needed; and
update a respective user profile in the data store to reflect that the second output indicating that supervision is needed was generated.

14. The system of claim 11, wherein the defects analysis application is further configured to:
generate instructions for the user of the receiving station to capture an image of the product; and
generate a product defect identifier in response to the defects report being initiated by the user, the defects report comprising a captured image of the product by at least one camera in communication with the receiving station, the captured image representing a condition of the product.

15. The system of claim 11, wherein the defects analysis application is further configured to:
- generate instructions for the user to forward the product to an inventory for fulfillment in response to the defects report indicating that no defect is detected; and
- generate instructions for the user to forward the product to a defects bin in response to the defects report indicating that at least one defect is detected.

16. A non-transitory computer-readable medium embodying a program executable in a computing device configured to cause the computing device to at least:
- initiate capture, in a vision tunnel positioned in a materials handling facility, a plurality of images of a plurality of sides of a product undergoing inspection received in the materials handling facility;
- extract a product identifier appearing within at least one of the plurality of images;
- identify a vendor profile of a vendor from a data store, the vendor profile being associated with the product identifier;
- retrieve the vendor profile associated with the product identifier, the product identifier being associated with the product undergoing inspection;
- determine that the vendor is associated with a plurality of defective products based at least in part upon a vendor defect history specified in the vendor profile;
- initiate redirection of the product to a receiving station based at least in part on the vendor being associated with the plurality of defective products, the receiving station comprising an image capture device and a display device;
- select an inspection sequence for a user to execute based at least in part on the vendor profile, the inspection sequence being selected according to the vendor defect history specified in the vendor profile;
- display the inspection sequence on the display device of the receiving station by way of a data communications network;
- capture an image that represents a condition of the product via the image capture device of the receiving station; and
- update the vendor profile in response to a defect report being obtained from the receiving station.

17. The non-transitory computer-readable medium of claim 16, further configured to cause the computing device to determine whether supervision of the user is needed based on a record of past performance by the user.

18. The non-transitory computer-readable medium of claim 17, further configured to cause the computing device to:
- generate a first output instructing the receiving station to discontinue further activity by the user;
- generate a second output indicating that supervision is needed; and
- update a respective user profile in the data store to reflect that the second output indicating that supervision is needed was generated.

19. The non-transitory computer-readable medium of claim 17, further configured to cause the computing device to:
- generate instructions for the user of the receiving station to capture the image of the product; and
- generate a product defect identifier in response to the defects report being initiated by the user, the defects report comprising the image that represents the condition of the product.

20. The non-transitory computer-readable medium of claim 17, further configured to cause the computing device to:
- generate instructions for the user to forward the product to an inventory for fulfillment in response to the defects report indicating that no defect is detected; and
- generate instructions for the user to forward the product to a defects bin in response to the defects report indicating that at least one defect is detected.

* * * * *